United States Patent
Cheon et al.

(10) Patent No.: US 11,239,995 B2
(45) Date of Patent: Feb. 1, 2022

(54) APPARATUS FOR PROCESSING APPROXIMATELY ENCRYPTED MESSAGES AND METHODS THEREOF

(71) Applicant: Crypto Lab Inc., Seoul (KR)

(72) Inventors: Jung Hee Cheon, Seoul (KR); Kyoo Hyung Han, Goyang-si (KR); Do Hyeong Ki, Seoul (KR); Minki Hhan, Seoul (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 16/696,541

(22) Filed: Nov. 26, 2019

(65) Prior Publication Data

US 2020/0228307 A1 Jul. 16, 2020

Related U.S. Application Data

(60) Provisional application No. 62/790,806, filed on Jan. 10, 2019.

(30) Foreign Application Priority Data

Jun. 5, 2019 (KR) .......................... 10-2019-0066572
Sep. 10, 2019 (KR) .......................... 10-2019-0112292

(51) Int. Cl.
*H04L 9/00* (2006.01)
*H04L 9/30* (2006.01)

(52) U.S. Cl.
CPC ............ *H04L 9/008* (2013.01); *H04L 9/3026* (2013.01); *H04L 9/3093* (2013.01)

(58) Field of Classification Search
CPC ...... H04L 9/008; H04L 9/3093; H04L 9/3026
See application file for complete search history.

(56) References Cited

U.S. PATENT DOCUMENTS

| | | | |
|---|---|---|---|
| 8,837,715 B2 * | 9/2014 | Troncoso Pastoriza | ..................... H04L 9/008 380/28 |
| 2010/0023572 A1 * | 1/2010 | Dupaquis | ................ G06F 7/726 708/492 |

(Continued)

FOREIGN PATENT DOCUMENTS

KR 20180092199 A 8/2018

OTHER PUBLICATIONS

Boura et al., "Chimera: a unified framework for B/FV, TFHE and HEAAN fully homomorphic encryption and predictions for deep learning," IACR Cryptology ePrint Archive; Aug. 17, 2018 (33 pages).

(Continued)

*Primary Examiner* — Vu V Tran
(74) *Attorney, Agent, or Firm* — Osha Bergman Watanabe & Burton LLP

(57) ABSTRACT

A method for processing an encryption is provided. The method for processing an encryption includes the steps of linearly transforming a homomorphic encryption for an approximate message including an error, performing an approximate modulus operation for the linearly transformed homomorphic encryption by using a multi-degree polynomial set such that input values within a predetermined range (Continued)

are approximate to an integer point, and linearly transforming the homomorphic encryption which was approximately modulus operated into a form of encryption.

12 Claims, 11 Drawing Sheets

(56) References Cited

U.S. PATENT DOCUMENTS

| | | | | |
|---|---|---|---|---|
| 2015/0215123 | A1* | 7/2015 | Kipnis | H04L 9/002 380/46 |
| 2016/0197726 | A1* | 7/2016 | Yasuda | H04L 9/008 380/28 |
| 2019/0334694 | A1* | 10/2019 | Chen | H04L 9/0631 |
| 2019/0361675 | A1* | 11/2019 | Haener | G06N 10/00 |
| 2019/0363872 | A1 | 11/2019 | Shim et al. | |
| 2020/0104636 | A1* | 4/2020 | Halevi | G06K 9/6228 |

OTHER PUBLICATIONS

Costache et al., "Faster Homomorphic Evaluation of Discrete Fourier Transforms," International Conference on Financial Cryptography and Data Security; Springer, Cham; Dec. 23, 2017 (13 pages).

Office Action issued in corresponding Korean Patent Application No. 10-2019-0112292, dated Mar. 10, 2020, with translation (12 pages).

Translation of International Search Report issued in corresponding International Application No. PCT/KR2019/016001, dated Mar. 6, 2020 (4 pages).

Translation of Written Opinion issued in corresponding International Application No. PCT/KR2019/016001, dated Mar. 6, 2020 (4 pages).

Office Action issued in corresponding Korean Patent Application No. 10-2019-0112292 dated Nov. 12, 2019, with translation (11 pages).

Hao Chen and Kyoohyung Han. "Homomorphic Lower Digits Removal and Improved FHE Bootstrapping." Annual International Conference on the Theory and Applications of Cryptographic Techniques. Springer, Cham, Mar. 31, 2018 (23 pages).

Christina Boura et al. (2018). "CHIMERA: Combining Ring-LWE-based Fully Homomorphic Encryption Schemes." Retrieved from https://eprint.iacr.org/2018/758.pdf (29 pages).

Jung Hee Cheon et al. "Bootstrapping for Approximate Homomorphic Encryption." Annual International Conference on the Theory and Applications of Cryptographic Techniques. Springer, Cham, Mar. 31, 2018 (21 pages).

Shai Halevi and Victor Shoup. "Bootstrapping for Helib." Annual International conference on the theory and applications of cryptographic techniques. Springer, Berlin, Heidelberg, Apr. 14, 2015 (30 pages).

* cited by examiner

Algorithm 1 Homomorphic $DFT_n^{NR}$ algorithm

---

Require: Ciphertext ctxt such that $Dec(ctxt, sk) = m \in \mathbb{C}^n$
  for all $1 \leq i \leq \log_2 n$ do
    $ctxt_0 \leftarrow CMult(diag_0(D_{2^i}^{(n)}), ctxt)$
    $ctxt_1 \leftarrow LeftRotate(ctxt, n/2^i)$
    $ctxt_2 \leftarrow RightRotate(ctxt, n/2^i)$
    $ctxt_1 \leftarrow CMult(diag_{n/2^i}(D_{2^i}^{(n)}), ctxt_1)$
    $ctxt_2 \leftarrow CMult(diag_{n-n/2^i}(D_{2^i}^{(n)}), ctxt_2)$
    $ctxt \leftarrow Add(ctxt_0, ctxt_1)$
    $ctxt \leftarrow Add(ctxt, ctxt_2)$
  end for

FIG. 9

| |
|---|
| Algorithm 2 Choosing the number of nodes in each interval |
| 1:   Input : Target degree n |
| 2:   Initialize $d_i$ = 1 for all i |
| 3:   while $\sum d_i - 1 \leq n$ do |
| 4:       Compute $M_i$ for each i |
| 5:       Find $i_0$ = argmax $M_i$ |
| 6:       $d_{i_0} \leftarrow d_{i_0} + 1$ |
| 7:   end while |
| 8:   Output : $d_i$'s |

APPARATUS FOR PROCESSING APPROXIMATELY ENCRYPTED MESSAGES AND METHODS THEREOF

CROSS-REFERENCE TO RELATED APPLICATION(S)

This application is based on and claims priority under 35 U.S.C. § 119(a) of a U.S. patent application No. 62/790,806, filed on Jan. 10, 2019, a Korean patent application number 10-2019-0066572, filed on Jun. 5, 2019, and a Korean patent application number 10-2019-0112292, filed on Sep. 10, 2019, in the Korean Intellectual Property Office, the disclosures of which are incorporated by reference herein in their entireties.

BACKGROUND

1. Field

The disclosure relates to an apparatus for performing a rebooting method for an approximately encrypted encryption effectively, and a method thereof.

2. Description of Related Art

As communication technologies are being developed, and distribution of electronic apparatuses are becoming active, continuous efforts for maintaining communication security among electronic apparatuses are being made. Accordingly, in most communication environments, encryption/decryption technologies are being used.

When a message encrypted by an encryption technology is transmitted to a counterpart, the counterpart has to perform decryption to use the message. In this case, waste of resources and time occurs in the process that the counterpart decrypts the encrypted data. Also, there is a problem that, in case hacking by a third party occurs while the counterpart temporarily decrypted the message for an operation, the message can be easily leaked to the third party.

For overcoming such a problem, a homomorphic encryption method is being researched. According to homomorphic encryption, even if an operation is performed in an encryption itself without decrypting encrypted information, the same result as a value which is a result of performing an operation for a plain text and encrypting the text can be achieved. Accordingly, various types of operations can be performed while an encryption is not decrypted.

However, as an operation proceeds, q in a homomorphic encryption is reduced, and thus it becomes impossible to proceed with the operation anymore. For preventing this, a rebooting method is being applied.

However, a conventional rebooting method requires a large amount of calculation or the accuracy of calculation is low. Accordingly, there is a demand for a rebooting method which can reduce the amount of calculation, and at the same time, of which accuracy of calculation is high.

SUMMARY

Accordingly, the disclosure was devised for overcoming the aforementioned problem, and the purpose of the disclosure is in providing an apparatus for performing a rebooting operation for an approximately encrypted encryption effectively, and a method thereof.

The disclosure is for achieving the aforementioned purpose, and a method for processing a homomorphic encryption according to an embodiment of the disclosure includes the steps of linearly transforming a homomorphic encryption for an approximate message including an error, performing an approximate modulus operation for the linearly transformed homomorphic encryption by using a multi-degree polynomial set such that input values within a predetermined range are approximate to an integer point, and linearly transforming the homomorphic encryption which was approximately modulus operated into a form of encryption.

In this case, the multi-degree polynomial may be a polynomial having a degree among any one of a 7th degree to an 80th degree, and the predetermined range may be from −12 to 12.

Meanwhile, in the step of performing an approximate modulus operation, a double-angle number of times and a multi-degree polynomial corresponding to the double-angle number of times may be set, and an approximate modulus operation may be performed by operating the linearly transformed homomorphic encryption as many times as the set double-angle number of times by using the set multi-degree polynomial.

Meanwhile, the step of linearly transforming a homomorphic encryption may include the steps of converting the homomorphic encryption into a form of polynomial, and applying the converted homomorphic encryption to a predefined matrix.

In this case, in the applying step, the predefined matrix may be decomposed into a plurality of block diagonal matrices wherein there is a value in a diagonal component and the other values are 0, and the homomorphic encryption may be applied sequentially to the plurality of block diagonal matrices.

In this case, in the applying step, the homomorphic encryption may be applied to the plurality of block diagonal matrices in units of two continuous matrices.

Meanwhile, an operation apparatus according to an embodiment of the disclosure may include a memory storing a homomorphic encryption for an approximate message including an error, and a processor performing an operation for the homomorphic encryption. The processor may linearly transform the homomorphic encryption for an approximate message including an error, perform an approximate modulus operation for the linearly transformed homomorphic encryption by using a multi-degree polynomial set such that input values within a predetermined range are approximate to an integer point, and linearly transform the homomorphic encryption which was approximately modulus operated into a form of encryption.

In this case, the multi-degree polynomial may be a polynomial having a degree among any one of a 7th degree to an 80th degree, and the predetermined range may be from −12 to 12.

Meanwhile, the processor may set a double-angle number of times and a multi-degree polynomial corresponding to the double-angle number of times, and perform an approximate modulus operation by operating the linearly transformed homomorphic encryption as many times as the set double-angle number of times by using the set multi-degree polynomial.

Meanwhile, the processor may convert the homomorphic encryption into a form of polynomial, and linearly transform the homomorphic encryption by applying the converted homomorphic encryption to a predefined matrix.

In this case, the processor may decompose the predefined matrix into a plurality of block diagonal matrices wherein there is a value in a diagonal component and the other values are 0, and linearly transform the homomorphic encryption by applying the homomorphic encryption sequentially to the plurality of block diagonal matrices.

Meanwhile, the processor may linearly transform the homomorphic encryption by applying the homomorphic encryption to the plurality of block diagonal matrices in units of two continuous matrices.

According to the aforementioned various embodiments of the disclosure, as an approximate polynomial optimized for homomorphic encryptions is used, it is possible to perform a modulus operation faster and with high accuracy. Also, as linear transformation is performed by using a plurality of block diagonal matrices, it is possible to operate with low operation complexity, and accordingly, a faster operation becomes possible.

BRIEF DESCRIPTION OF THE DRAWINGS

FIG. 6 is a diagram for illustrating a linear calculating operation according to the disclosure;

FIG. 9 is a diagram for illustrating a method for calculating a coefficient of an approximate polynomial according to the disclosure;

DETAILED DESCRIPTION

Figure 1:
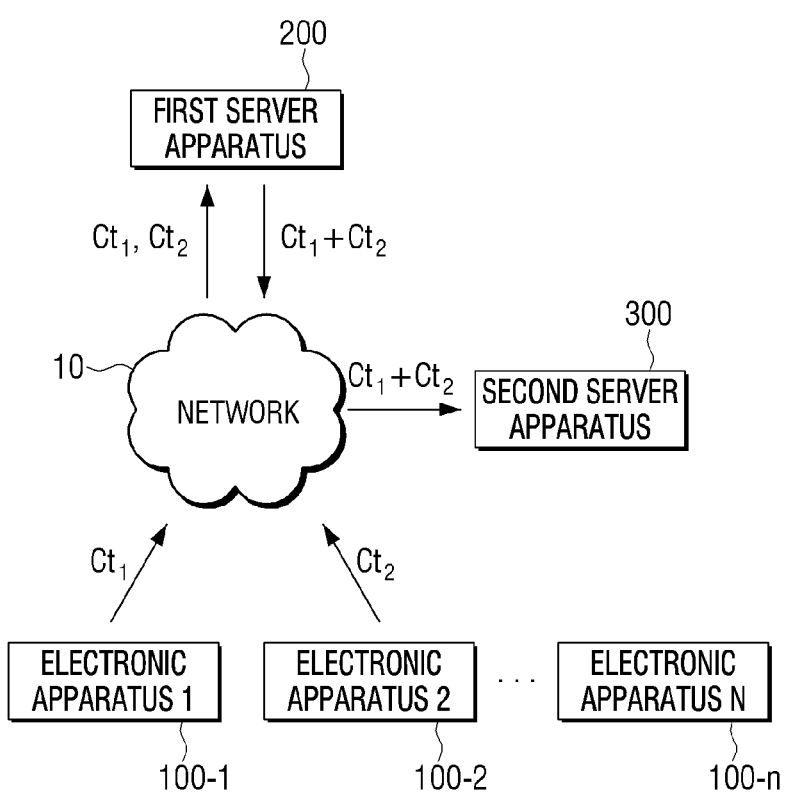
FIG. 1 is a diagram for illustrating a configuration of a network system according to an embodiment of the disclosure.

Hereinafter, the disclosure will be described in detail with reference to the accompanying drawings. Meanwhile, for the information (data) transferring process performed in the disclosure, encryption/decryption may be applied depending on needs, and all the expressions explaining the information (data) transferring process in the disclosure and the appended claims are to be interpreted to include cases of performing encryption/decryption, even if there is no separate mention in that regard. Also, in the disclosure, expressions such as "transfer (transmit) from A to B" and "A receives from B" include the case wherein an object is transferred (transmitted) or received with another medium included in between, and does not necessarily express only the case wherein an object is directly transferred (transmitted) from A to B.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification has a meaning including a case wherein elements other than elements listed as being included are further included.

In addition, in the disclosure, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

Also, in the disclosure, "a value" is defined as a concept including a vector as well as a scalar value.

In addition, the mathematical operations and calculations in each step of the disclosure that will be described below may be implemented as computer operations by a known coding method for performing the operations or calculations and/or coding devised to be appropriate for the disclosure.

Further, the specific mathematical formulae that will be described below are suggested as examples among several possible alternatives, and the scope of the disclosure is not intended to be interpreted to be limited to the mathematical formulae mentioned in the disclosure.

For the convenience of explanation, symbols in the disclosure are defined as follows.

a←D: Element a is selected according to distribution D.

$s_1, s_2 \in R$: Each of S1 and S2 is an element belonging to group R.

mod(q): A modular operation is performed with element q.

[·]: The internal value is rounded off.

Hereinafter, various embodiments of the disclosure will be described in detail with reference to the accompanying drawings.

FIG. 1 is a diagram for illustrating a configuration of a network system according to an embodiment of the disclosure.

Referring to FIG. 1, a network system may include a plurality of electronic apparatuses 100-1~100-n, a first server apparatus 200, and a second server apparatus 300, and each component may be connected with one another through a network 10.

The network 10 may be implemented as various forms of wired and wireless communication networks, broadcasting communication networks, optical communication networks, cloud networks, etc., and each apparatus may be connected by methods such as WiFi, Bluetooth, Near Field Communication (NFC), etc. without a separate medium.

In FIG. 1, it was illustrated that there are a plurality of electronic apparatuses 100-1~100-n, but a plurality of electronic apparatuses do not necessarily have to be used, and one apparatus may be used. As an example, the electronic apparatuses 100-1~100-n may be implemented as various forms of apparatuses such as a smartphone, a tablet, a game player, a PC, a laptop PC, a home server, a kiosk, etc., and other than the above, the electronic apparatuses may also be implemented in the form of home appliances to which an IoT function has been applied.

A user may input various information through the electronic apparatuses 100-1~100-n he or she uses. The information input may be stored in the electronic apparatuses 100-1~100-$n$ themselves, but it may also be transferred to an external apparatus and stored for reasons such as the storage capacity and security, etc. In FIG. 1, the first server apparatus 200 may perform a role of storing such information, and the second server apparatus 300 may perform a role of using a portion or all of the stored information.

Each electronic apparatus 100-1~100-$n$ may homomorphically encrypt the information input and transfer the homomorphic encryption to the first server apparatus 200.

Also, each electronic apparatus 100-1~100-$n$ may include an encryption noise calculated in the process of performing homomorphic encryption, i.e., an error in an encryption. Specifically, a homomorphic encryption generated in each electronic apparatus 100-1~100-$n$ may be generated in a form wherein a result value including a message and an error value is restored when the encryption is decrypted by using a secret key later.

As an example, homomorphic encryptions generated in the electronic apparatuses 100-1~100-$n$ may be generated in forms satisfying a property as follows when they are decrypted by using a secret key.

$$Dec(ct,sk) = \langle ct, sk \rangle = M + e \pmod{q} \quad \text{[Formula 1]}$$

Here, $\langle, \rangle$ mean a usual inner product, ct means an encryption, sk means a secret key, M means a plain text message, e means an encryption error value, and mod q means a modulus of the encryption. q should be selected to be bigger than the result value M of multiplying a scaling factor $\Delta$ and the message. If the absolute value of the error value e is sufficiently smaller than M, the decryption value M+e of the encryption is a value that can replace the original message with the same degree of precision in a significant figure operation. In the decrypted data, the error may be arranged on the side of the least significant beat (LSB), and M may be arranged on the side of the second least significant beat.

In case the size of a message is too small or too big, the size may be adjusted by using a scaling factor. If a scaling factor is used, not only a message in the form of an integer but also a message in the form of a real number can be encrypted, and thus usability can be improved greatly. Also, by adjusting the size of a message by using a scaling factor, the size of an area wherein messages exist in an encryption after an operation is performed, i.e., an effective area can be adjusted.

Depending on embodiments, an encryption modulus q may be used while being set in various forms. As an example, a modulus of an encryption may be set in the form of $q = \Delta^L$ which is an exponentiation of a scaling factor $\Delta$. If $\Delta$ is 2, the modulus may be set as a value such as $q = 2^{10}$.

The first sever apparatus 200 may not decrypt a received homomorphic encryption, but store it in a state of an encryption.

The second server apparatus 300 may request a result of specific processing for the homomorphic encryption to the first server apparatus 200. The first server apparatus 200 may perform a specific operation according to the request of the second server apparatus 300, and transfer the result to the second server apparatus 300.

As an example, in case encryptions ct1, ct2 transferred from two electronic apparatuses 100-1, 100-2 are stored in the first server apparatus 200, the second server apparatus 300 may request a value of summing up the information provided from the two electronic apparatuses 100-1, 100-2 to the first server apparatus 200. The first server apparatus 200 may perform an operation of summing up the two encryptions according to the request, and then transfer the result value (ct1+ct2) to the second server apparatus 300.

By virtue of the property of a homomorphic encryption, the first server apparatus 200 may perform an operation while a homomorphic encryption is not decrypted, and a result value thereof also becomes a form of encryption. In the disclosure, a result value acquired by an operation is referred to as an operation result encryption.

The first server apparatus 200 may transfer an operation result encryption to the second server apparatus 300. The second server apparatus 300 may decrypt the received operation result encryption, and acquire an operation result value of data included in each homomorphic encryption.

The first server apparatus 200 may perform operations a number of times according to a user request. In this case, the proportion of an approximate message in an operation result encryption acquired for each operation varies. If the proportion of an approximate message exceeds a threshold, the first server apparatus 200 may perform a rebooting operation. As described above, the first server apparatus 200 may perform an operating operation, and thus it may also be referred to as an operation apparatus.

Specifically, if q is smaller than M in the aforementioned formula 1, M+e(mod q) will have a different value from M+e, and thus decryption becomes impossible. Accordingly, the q value should always be maintained to be bigger than M. However, as an operation proceeds, the q value decreases gradually. Accordingly, an operation of changing the q value to be always bigger than M is needed, and such an operation is referred to as a rebooting operation. As such a rebooting operation is performed, the encryption may become a state of being operable again. Specific operations related to rebooting will be described later with reference to FIGS. 3 to 6.

Meanwhile, in FIG. 1, a case wherein encryption is performed at a first electronic apparatus and a second electronic apparatus, and the second server apparatus performs decryption is illustrated, but the disclosure is not necessarily limited thereto.

Figure 2:
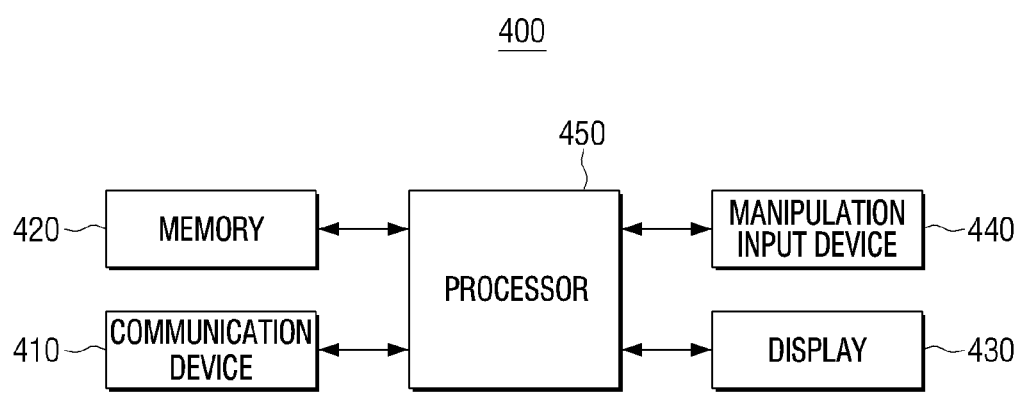
FIG. 2 is a block diagram illustrating a configuration of an operation apparatus according to an embodiment of the disclosure.

FIG. 2 is a block diagram illustrating a configuration of an operation apparatus according to an embodiment of the disclosure.

Specifically, apparatuses performing homomorphic encryption as the first electronic apparatus, the second electronic apparatus, etc., apparatuses operating a homomorphic encryption such as the first server apparatus, etc., and apparatuses decrypting a homomorphic encryption such as the second server apparatus, etc. in the system in FIG. 1 may be referred to as operation apparatuses. Such operation apparatuses may be various apparatuses like personal computers (PCs), laptop computers, smartphones, tablets, servers, etc.

Referring to FIG. 2, an operation apparatus 400 may include a communication device 410, a memory 420, a display 430, a manipulation input device 440, and a processor 450.

The communication device 410 is formed to connect the operation apparatus 400 with an external apparatus (not shown), and it may not only be a form of being connected with an external apparatus through a Local Area Network (LAN) and an Internet network, but also a form of being connected through a Universal Serial Bus (USB) port or a wireless communication (e.g., WiFi 802.11a/b/g/n, NFC, Bluetooth) port. Such a communication device 410 may also be referred to as a transceiver.

The communication device 410 may receive a public key from an external apparatus, and transfer a public key generated by the operation apparatus 400 itself to an external apparatus.

Also, the communication device 410 may receive a message from an external apparatus, and transmit a generated homomorphic encryption to an external apparatus.

In addition, the communication device 410 may receive various types of parameters necessary for generating an encryption from an external apparatus. Meanwhile, in implementation, various types of parameters may be directly input from a user through the manipulation input device 440 that will be described below.

Further, the communication device 410 may receive a request for an operation for a homomorphic encryption from an external apparatus, and transfer a result calculated accordingly to an external apparatus.

The memory 420 is a component for storing an O/S for operating the operation apparatus 400 or various types of software, data, etc. The memory 420 may be implemented in various forms such as a RAM or a ROM, a flash memory, an HDD, an external memory, a memory card, and the like, but is not limited to a specific one.

Also, the memory 420 stores a message to be encrypted. Here, a message may be various types of credit information, personal information, etc. that a user cited in various ways, or it may be information related to use history such as location information used at the operation apparatus 400, information on the use time of the Internet, etc.

In addition, the memory 420 may store a public key, and in case the operation apparatus 400 is an apparatus that directly generated a public key, the memory 420 may store not only a secret key, but also various types of parameters necessary for generating a public key and a secret key.

Further, the memory 420 may store a homomorphic encryption generated in a process that will be described below. Also, the memory 420 may store a homomorphic encryption transferred from an external apparatus. In addition, the memory 420 may store an operation result encryption which is a result of an operation process that will be described below.

The display 430 displays a user interface window for receiving selection of functions supported by the operation apparatus 400. Specifically, the display 430 may display a user interface window for receiving selection of various functions provided by the operation apparatus 400. Such a display 430 may be a monitor such as a liquid crystal display (LCD) and organic light emitting diodes (OLEDs), and it may be implemented as a touch screen that can simultaneously perform the function of the manipulation input device 440 that will be described below.

Also, the display 430 may display a message requesting input of a parameter necessary for generating a secret key and a public key. In addition, the display 430 may display a message wherein a subject to be encrypted selects a message. Meanwhile, in implementation, a subject to be encrypted may be directly selected by a user, or selected automatically. That is, personal information, etc. which need to be encrypted may be set automatically even if a user does not directly select a message.

The manipulation input device 440 may receive selection of a function of the operation apparatus 400 and input of a control command for the function from a user. Specifically, the manipulation input device 440 may receive input of a parameter necessary for generating a secret key and a public key. Also, the manipulation input device 440 may receive setting of a message to be encrypted from a user.

The processor 450 controls each component inside the operation apparatus 400. Such a processor 450 may be constituted as a single device such as a central processing unit (CPU) and an application-specific integrated circuit (ASIC), or it may be constituted as a plurality of devices such as a CPU and a graphics processing unit (GPU).

When a message to be transferred is input, the processor 450 stores the message in the memory 420. Then, the processor 450 homomorphically encrypts the message by using various setting values and programs stored in the memory 420. In this case, a public key may be used.

The processor 450 may generate a public key necessary for performing encryption by itself and use it, or receive a public key from an external apparatus and use it. As an example, the second server apparatus 300 performing decryption may distribute a public key to other apparatuses.

In case the processor 450 generates a key by itself, the processor 450 may generate a public key by using a Ring-LWE technic. To explain in detail, the processor 450 may set various types of parameters and rings first, and store them in the memory 420. As examples of parameters, there may be the length of a plain text message bit, the sizes of a public key and a secret key, and the like.

A ring may be expressed with a formula as below.

$$R = \mathbb{Z}_q[x]/(f(x)) \qquad \text{[Formula 2]}$$

Here, R means a ring, Zq means a coefficient, and f(x) means an n-th polynomial.

A ring is a group of polynomials having preset coefficients, and means a group wherein additions and multiplications are defined among elements, and which is closed with respect to additions and multiplications.

As an example, a ring means a group of n-th polynomials of which coefficients are Zqs. Specifically, when n is Φ(N), it means an N-th cyclotomic polynomial. Meanwhile, (f(x)) means an ideal of Zq[x] generated as f(x)). Also, an Euler totient function Φ(N) means the number of natural numbers which are mutual primes with N, and are smaller than N. When $\Phi_N(x)$ is defined as an N-th cyclotomic polynomial, a ring may also be expressed as formula 3 as below.

$$R = \mathbb{Z}_q[x]/(\psi_N(x)) \qquad \text{[Formula 3]}$$

A secret key sk may be expressed as below.

Meanwhile, the ring in the aforementioned formula 3 has a complex number in a plain text space. Meanwhile, for improving the operation speed for a homomorphic encryption, only a group wherein a plain text space is a real number may be used among the aforementioned groups of rings.

When a ring as described above is set, the processor 450 may calculate a secret key sk from the ring.

$$sk \leftarrow (1, s(x)), s(x) \in R \qquad \text{[Formula 4]}$$

Here, s(x) means a polynomial which was randomly generated with a small coefficient.

Then, the processor 450 calculates a first random polynomial a(x) from the ring. The first random polynomial may be expressed as below.

$$a(x) \leftarrow R \qquad \text{[Formula 5]}$$

Also, the processor 450 may calculate an error. Specifically, the processor 450 may extract an error from discrete Gaussian distribution or distribution of which statistical distance thereto is close. Such an error may be expressed as below.

$$e(x) \leftarrow D_{\alpha q}^n \qquad \text{[Formula 6]}$$

When an error is calculated, the processor 450 may perform a modular operation on the first random polynomial and the error in the secret key and calculate a second random polynomial. The second random polynomial may be expressed as below.

$$b(x)=-a(s)s(x)+e(x)(\bmod q) \quad \text{[Formula 7]}$$

Ultimately, a public key pk is set in the form of including the first random polynomial and the second random polynomial as below.

$$pk=(b(x),a(x)) \quad \text{[Formula 8]}$$

The aforementioned key generating method is merely an example, and thus the disclosure is not necessarily limited thereto, and a public key and a secret key can obviously be generated by methods other than the above.

Meanwhile, when a public key is generated, the processor 450 may control the communication device 410 such that the public key is transferred to other apparatuses.

Also, the processor 450 may generate a homomorphic encryption for a message. Specifically, the processor 450 may generate a homomorphic encryption by applying the public key generated previously to a message. Here, the processor 450 may generate the length of the encryption to correspond to the size of the scaling factor.

Then, when a homomorphic encryption is generated, the processor 450 may store the homomorphic encryption in the memory 420, or control the communication device 410 to transfer the homomorphic encryption to another apparatus according to a user request or a preset default command.

Meanwhile, according to an embodiment of the disclosure, packing may be performed. If packing is used in homomorphic encryption, it becomes possible to encrypt a plurality of messages into one encryption. In this case, if operations among each encryption are performed at the operation apparatus 400, operations for a plurality of messages are ultimately processed in parallel, and thus burden of operations gets to be reduced greatly.

Specifically, in case a message consists of a plurality of message vectors, the processor 450 may convert the message into a polynomial in a form which can encrypt the plurality of message vectors in parallel, and then multiply the polynomial with the scaling factor and perform homomorphic encryption by using a public key. Accordingly, an encryption wherein a plurality of message vectors are packed may be generated.

Then, in case decryption of the homomorphic encryption is necessary, the processor 450 may generate a decryption in the form of a polynomial by applying a secret key to the homomorphic encryption, and generate a message by decoding the decryption in the form of a polynomial. Here, the generated message may include an error as mentioned in formula 1 described above.

Also, the processor 450 may perform an operation for an encryption. Specifically, the processor 450 may perform an operation such as an addition and a multiplication for a homomorphic encryption while the homomorphic encryption is maintained in an encrypted state. Specifically, the processor 450 may process each homomorphic encryption to be used for an operation as a first function, and perform an operation such as an addition and a multiplication between homomorphic encryptions processed as first functions, and process the homomorphic encryptions for which an operation was performed as second functions which are reverse functions of the first functions. For such first function processing and second function processing, a linear transformation technology in a rebooting process that will be described below may be used.

Meanwhile, when an operation is completed, the operation apparatus 400 may detect data in an effective area from the operation result data. Specifically, the operation apparatus 400 may detect data in an effective area by performing rounding processing for the operation result data. Rounding processing means proceeding round-off of a message in an encrypted state, and it may also be referred to differently as resealing. Specifically, the operation apparatus 400 multiplies each component of an encryption with $\Delta^{-1}$ which is a reciprocal number of a scaling factor and performs round-off, and thereby removes a noise area. A noise area may be determined to correspond to the size of the scaling factor. Ultimately, a message in an effective area from which a noise area has been removed can be detected. As the above process proceeds in an encrypted state, an additional error occurs, but the size of the error is sufficiently small, and thus it can be ignored.

Figure 3:
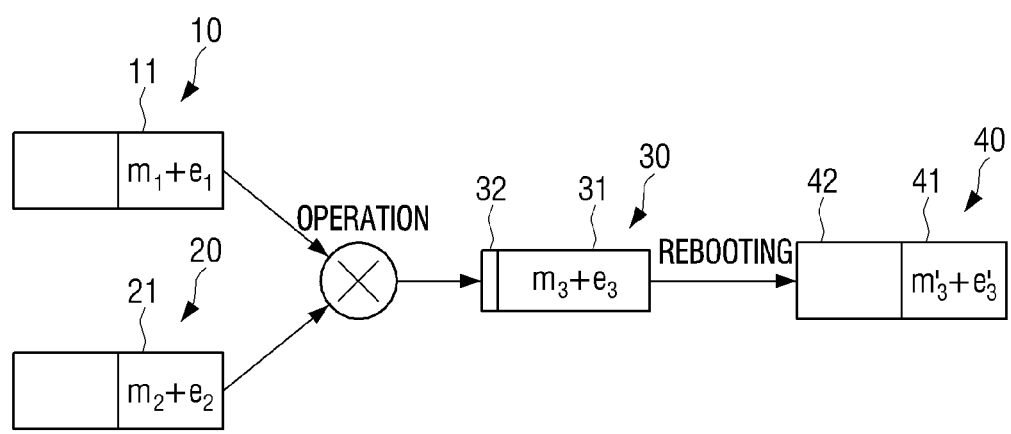
FIG. 3 is a diagram for illustrating an operating operation of an operation apparatus according to the disclosure.

Also, if the proportion of an approximate message in an operation result encryption exceeds a threshold, the operation apparatus 400 may perform a rebooting operation for the encryption. A rebooting operation will be described below with reference to FIG. 3 to FIG. 3 is a diagram for illustrating an operating operation of an operation apparatus according to the disclosure. Specifically, in FIG. 3, operation and rebooting processes for two homomorphic encryptions 10, 20 are illustrated.

Each homomorphic encryption 10, 20 may respectively include approximate message areas 11, 21. In the approximate message areas 11, 21, messages and errors $m_1+e_1$, $m_2+e_2$ are included together.

The operation apparatus 400 may perform a specific operation by using the two homomorphic encryptions 10, 20 as input values.

The operation result encryption 30 may include an approximate message area 31 including the operation result $m_3+e_3$ between each approximate message. As the operation result becomes bigger than the input value, an approximate message area also becomes bigger, and accordingly, the remaining plain text space 32 decreases. If such an operation is performed several times, the remaining plain text space 32 ultimately disappears or becomes smaller than the threshold, and thus an operation cannot be performed. If such a state is determined, the operation apparatus 400 can perform a rebooting operation. A specific rebooting operation will be described with reference to FIG. 5.

It can be seen that in an encryption 40 for which rebooting was performed, an approximate message area 41 was decreased, but instead, a plain text space 42 was extended. There is a slight difference between the approximate message $m_3+e_3$ in the encryption before rebooting and the approximate message $m_3$, $+e_3$, in the encryption after rebooting, but the difference in the size of an error is small, and thus there is no big difference compared to the original message.

A conventional encryption/decryption mechanism is designed such that data after decryption becomes the same as the original plain text, but according to an embodiment of the disclosure, an approximate message is output instead of exactly the same plain text. Ultimately, an error necessary for safety and an error generated through an operation of effective numbers are included and treated as a noise, and thus an operation of real numbers becomes possible in an encrypted state, and efficiency of encryption/decryption can be increased.

Figure 4:
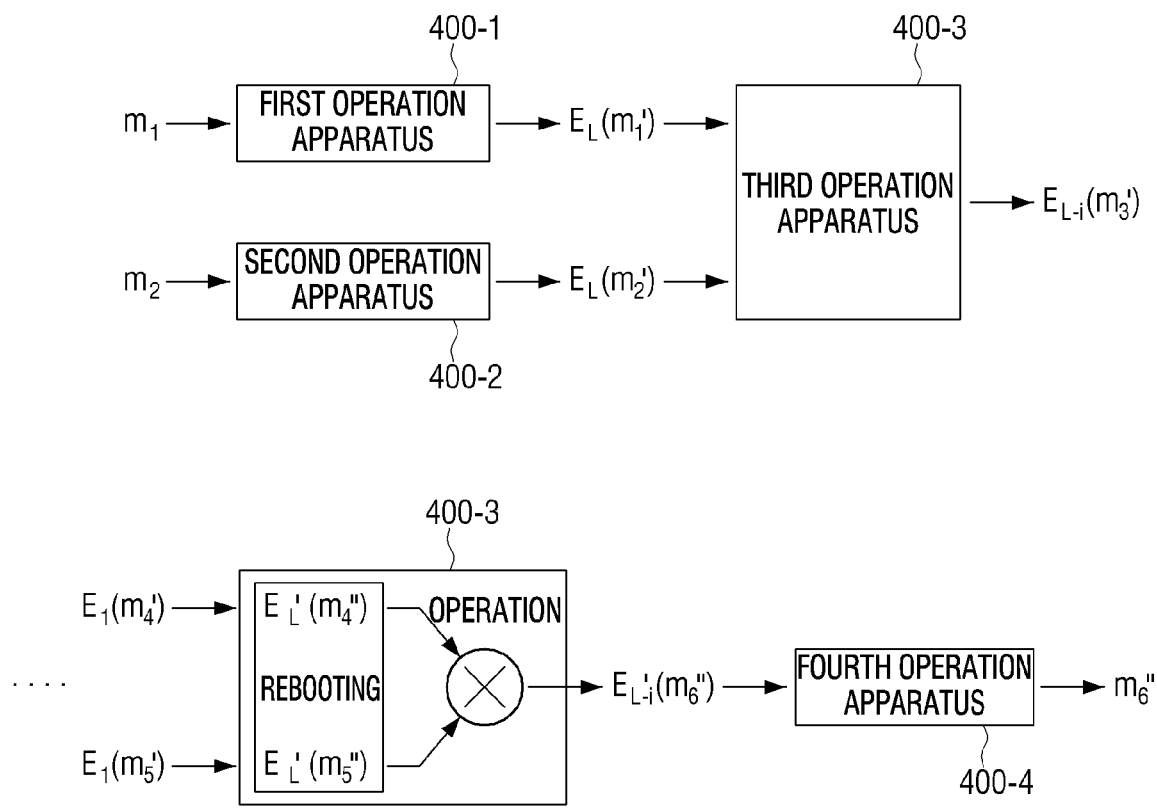
FIG. 4 is a diagram for illustrating a rebooting method according to the disclosure.

FIG. 4 is a diagram for illustrating a rebooting method according to the disclosure.

Referring to FIG. 4, the first operation apparatus 400-1 and the second operation apparatus 400-2 may homomorphically encrypt a message $m_1$ and a message $m_2$ respectively, and output homomorphic encryptions $E_L(m_{1'})$ and $E_L(m_{2'})$.

The third operation apparatus 400-3 may perform an operation for the homomorphic encryptions $E_L(m_{1'})$ and $E_L(m_{2'})$, and output an operation result encryption $E_{L-i}(m_{3'})$. Here, L means a modulus level of the encryption. As the operation is repeated, the modulus level continuously decreases. For example, if the depth of an operation that the third operation apparatus 400-3 seeks to perform in an encrypted state is i, the modulus level decreases as much as i. Accordingly, if a modulus level drops below the threshold, a further operation for the homomorphic encryptions becomes impossible.

In FIG. 4, the threshold was set as level 1. Accordingly, it can be seen that the homomorphic encryptions $E_1(m_{4'})$ and $E_1(m_{5'})$ of level 1 cannot be operated.

In case the modulus level is lower than the threshold, the third operation apparatus 400-3 may reboot each of $E_1(m_{4'})$ and $E_1(m_{5'})$, and generate $E_{L'}(m_{4''})$ and $E_{L'}(m_{5''})$. By rebooting, the modulus level becomes level L' which is almost similar to L, and the approximate message also changes from $m_{4'}$ and $m_{5'}$ to $m_{4''}$ and $m_{5''}$ which are almost similar.

The third operation apparatus 400-3 may operate the rebooted encryptions, and provide an operation result encryption $E_{L'-i}(m_{6''})$ to the fourth operation apparatus 400-4. The operation result encryption ultimately operated may be expressed as the following formula.

$$Ctxt = (v \cdot b(x) + m_{6''} + e_{4''}, v \cdot a(x) + e_{5''}) \in R \times R \quad [\text{Formula 9}]$$

The fourth operation apparatus 400-4 may decrypt the operation result encryption and acquire an approximate message $m_{6''}$.

For decryption, the fourth operation apparatus 400-4 may use additional information. As described above, additional information may be a scaling factor changed during an operation process, a modulus value used for extension of a plain text space, etc. If a changed scaling factor is $\Delta'$, a decrypted approximate message may be $m_{6''}/\Delta'$. Accordingly, even if a plain text in a real number is integerized in an encryption process, it can be restored to a real number again in decryption. Also, a modulus value in additional information may be used as a modulus of a ring R in formula 9.

The fourth operation apparatus 400-4 may ultimately acquire $m_6'$ through decryption.

Meanwhile, in illustrating and explaining FIG. 4, it was explained that a rebooting operation for input homomorphic encryptions is performed before an operation of two encryptions, but in implementation, a rebooting operation for an operation result may be performed as in FIG. 3.

Hereinafter, a specific rebooting operation will be explained with reference to FIG. 5.

Figure 5:
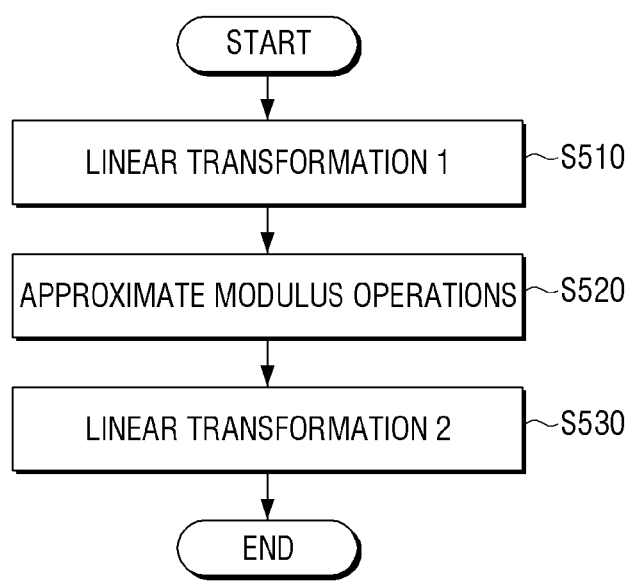
FIG. 5 is a diagram for illustrating a specific operation of a rebooting method according to the disclosure.

FIG. 5 is a diagram for illustrating a specific operation of a rebooting method according to the disclosure.

Referring to FIG. 5, a homomorphic encryption for an approximate message including an error is linearly transformed at operation S510. Specifically, in a homomorphic encryption, a plurality of encryptions may be packed as described above. Thus, the homomorphic encryption may be converted into a form of polynomial for calculating the plurality of encryptions.

Next, the homomorphic encryption converted into a form of polynomial may be applied to a predefined matrix (specifically, formula 10 below). Specifically, a polynomial of a homomorphic encryption consists of complex numbers as explained above. Thus, linear transformation may be performed by using a predefined matrix for converting each coefficient of the polynomial into a form of being put in a slot. Here, a predefined matrix may be a discrete Fourier transform (DFT) matrix.

Meanwhile, in implementation, linear transformation may be performed by using a plurality of block diagonal matrices for performing linear transformation faster. Here, a block diagonal matrix is a matrix wherein there is a value in the diagonal component, and the other values are 0. The reason that a plurality of block diagonal matrices may be used and an effect thereof will be described in detail in the lower part of FIG. 5.

When linear transformation is completed, an approximate modulus operation may be performed at operation S520. Specifically, the linearly transformed homomorphic encryption may be approximately modulus operated by using a multi-degree polynomial set such that input values within a predetermined range are approximate to an integer point. An approximate modulus operating operation according to the disclosure will be described later with reference to FIG. 9.

When an approximate modulus operation is completed, the homomorphic encryption that was approximately modulus operated is linearly transformed in a form of encryption at operation S530. Specifically, the homomorphic encryption that was approximately modulus operated may be converted into a form of polynomial by using an inverse matrix corresponding to the matrix used in linear transformation of the homomorphic encryption previously, and the converted polynomial may be converted into a form of encryption.

As described above, in a rebooting operation according to an embodiment of the disclosure, an approximate modulus operation is performed through a multi-degree polynomial calculated by a characteristic of a homomorphic encryption. Accordingly, a faster rebooting operation can be performed. Also, in linear transformation, operation processing is performed by decomposing a preset matrix into a plurality of block diagonal matrices, and thus it is possible to perform an operation with low operation complexity.

Hereinafter, the aforementioned linear transformation operation will be described in more detail.

For a homomorphic encryption, packing may be applied. That is, several messages are encrypted into one message. In this aspect, an operation of linearly transforming a packed homomorphic encryption is an important operation in homomorphic encryption.

Such linear transformation is modification of coefficients of a homomorphic encryption expressed as a polynomial into slots. For such an operation, a discrete Fourier transform (DFT) matrix may be used. The aforementioned DFT matrix may be indicated as formula 10 below.

$$U = \begin{bmatrix} 1 & w_0 & w_0^2 & \cdots & w_0^{N-1} \\ 1 & w_1 & w_1^2 & \cdots & w_1^{N-1} \\ \vdots & \vdots & \vdots & \ddots & \vdots \\ 1 & w_{N/2-1} & w_{N/2-1}^2 & \cdots & w_{N/2-1}^{N-1} \end{bmatrix} \quad [\text{Formula 10}]$$

Here, U means a DFT matrix, and $w_i = w^{5^i}$, and $w = \exp(2\pi i/M)$ for $M=2N$. Also, N means a polynomial ring dimension.

Meanwhile, if a homomorphic encryption is applied to such a DFT matrix as it is, the calculation complexity gets to have O(n). As can be seen above, in case a DFT matrix is applied as it is, the calculation complexity is high.

Meanwhile, in case there are only small numbers in a matrix, a multiplication operation between the matrix and a vector may become fast. For this, a matrix as the aforementioned formula 10 may be factorized and decomposed into a plurality of sparse matrices. Specifically, for decomposing a matrix, a recursive FFT Cooley-Tukey algorithm may be used, and the method thereof is as formula 11.

$$DFT_n^{NR} = \begin{bmatrix} DFT_{n/2}^{NR} & DFT_{n/2}^{NR} \\ DFT_{n/2}^{NR} \cdot & -DFT_{n/2}^{NR} \cdot \\ W_{n/2} & W_{n/2} \end{bmatrix} = \quad \text{[Formula 11]}$$

$$\begin{bmatrix} DFT_{n/2}^{NR} & 0 \\ 0 & -DFT_{n/2}^{NR} \end{bmatrix} \cdot \begin{bmatrix} I_{n/2} & I_{n/2} \\ W_{n/2} & -W_{n/2} \end{bmatrix}$$

Here, $W_{n/2} = \text{diag}(1, \omega_n, \omega_n^2, \ldots, \omega_n^{n/2-1})$, and $\omega_n = e^{2\pi i/n}$.

If a method as above is repeatedly applied, a DFT matrix may be decomposed into a $\log_2 n$ number. The following formula 12 indicates the form of recursive matrice.

$$D_k^{(n)} = \begin{bmatrix} \begin{bmatrix} I_{n/k} & I_{n/k} \\ W_{n/k} & -W_{n/k} \end{bmatrix} & 0 & \cdots & 0 \\ 0 & \begin{bmatrix} I_{n/k} & I_{n/k} \\ W_{n/k} & -W_{n/k} \end{bmatrix} & \cdots & 0 \\ \vdots & \vdots & \ddots & \vdots \\ 0 & 0 & 0 & \begin{bmatrix} I_{n/k} & I_{n/k} \\ W_{n/k} & -W_{n/k} \end{bmatrix} \end{bmatrix} \in \mathbb{C}^{(n \times n)}$$

[Formula 12]

Here, k/2 is a diagonal block, and a DFT matrix can be expressed as formula 13 as follows.

$$DFT_n^{NR} = D_n^{(n)} \cdot D_{n/2}^{(n)} \cdot \ldots \cdot D_2^{(n)} \quad \text{[Formula 13]}$$

As described above, a DFT matrix may be decomposed into sparse diagonal matrices, and in the disclosure, linear transformation may be performed by using decomposed sparse diagonal matrices (or block diagonal matrices). Hereinafter, it will be explained why an operation using a plurality of sparse diagonal matrices is more effective than using one DFT matrix.

If a multiplication of a matrix and a vector is expressed as a Hadamard multiplication and a vector movement, it is as formula 14 as follows.

$$M \cdot v = \sum_{i=0}^{n} \text{diag}_i(M) \odot rot_i(v) \quad \text{[Formula 14]}$$

A matrix-vector multiplication algorithm as described above is effective for a matrix M which is a diagonal vector of a small number which is not 0. That is, $\text{diag}_i(M)$ is a non-zero vector for a small number i. Such a matrix is referred to as a sparse diagonal matrix. In case a sparse diagonal matrix M satisfies $\text{diag}_i(M)=0$ for i, there is no need to calculate $rot_i(v)$. That is, the number of movements in this process becomes the number of diagonal lines.

Accordingly, in a calculation for a homomorphic encryption for a decomposed matrix, calculation complexity can be reduced to O(log n). A calculation process using a decomposed matrix may be performed as in FIG. 6. A calculation method using a decomposed matrix will be explained below with reference to FIG. 6.

FIG. 6 is a diagram for illustrating a linear calculating operation according to the disclosure.

Referring to FIG. 6, each loop includes two homomorphic rotations and three constant vector multiplications. Specifically, a left rotation operation for n/2 is identical to a right rotation operation for n/2. For this reason, in case i=1, there is no need to calculate a left rotation and a right rotation. Accordingly, homomorphic rotations can be reduced, and thus the operation in FIG. 6 includes only homomorphic rotations as many as ($2 \log_2 n - 1$) and constant calculations as many as ($3 \log_2 n$).

Meanwhile, in case a homomorphic encryption is linearly transformed by the aforementioned method, complexity becomes low, but instead, depth increases. Accordingly, for adjusting complexity and depth appropriately, two block diagonal matrices may be grouped into one as in formula 15 below.

$$DFT_n^{NR} = D_n^{(n)} \cdot D_{n/2}^{(n)} \cdot D_{n/4}^{(n)} \cdot D_{n/8}^{(n)} \cdot \ldots \cdot D_{16}^{(n)} \cdot D_8^{(n)} \cdot D_4^{(n)} \cdot D_2^{(n)} \quad \text{[Formula 15]}$$

$$= (D_n^{(n)} \cdot D_{n/2}^{(n)}) \cdot (D_{n/4}^{(n)} \cdot D_{n/8}^{(n)}) \cdot \ldots \cdot (D_d^{(n)} \cdot D_2^{(n)})$$

In formula 15 as above, an original matrix is decomposed by a $\log_4 n$ number as in formula 16 below.

$$D_i^{(n;4)} = (D_{2^{2i}}^{(n)} \cdot D_{2^{2i-1}}^{(n)}) \text{ for } 1 \leq i \leq \log_4 n \quad \text{[Formula 16]}$$

Here, if formula 16 is expressed again by using $r=2^k$, it is as follows.

$$D_j^{(n;r)} = (D_{r^j}^{(n)} \cdot D_{r^{j/2}}^{(n)} \cdot \ldots \cdot D_{r^{j-1} \cdot 2}^{(n)}) \quad \text{[Formula 17]}$$

If a content as above is reflected to formula 14, linear transformation can be expressed as formula 18 as follows.

$$\sum_{i=1}^{t} m_i \odot rot_{l_i}(v) = \sum_{i=0}^{k_1-1} \sum_{j=1}^{k_2} m_{ik_2+j} \odot rot_{l \cdot (ik_2+j)}(v) = \quad \text{[Formula 18]}$$

-continued $$\sum_{i=0}^{k_1-1} rot_{lk_2 i} \left( \sum_{j=1}^{k_2} rot_{-lb_2 i}(m_{ik_2+j}) \odot rot_{lj}(v) \right)$$

Here, $m_i$=diag$_{ii}$(M), and $k_1 k_2$=t.

For an operation as above, homomorphic rotations as many as $O(\sqrt{t})$ and constant vector calculations as many as $O(t)$ are needed. Through such an operation, complexity slightly increases compared to the previous method, but the depth becomes lower than in the previous method. Here, a slight increase in complexity just means that complexity increases compared to a method of using a DFT matrix by converting it into a plurality of block diagonal matrices by a method as in formula 13, and complexity is lower than the case of using a DFT matrix as it is.

A linear transformation operation as above may be used not only in linear transformation in a rebooting process, but in various processes wherein there is a need to convert a coefficient of a polynomial into a slot such as an encoding process in a process of generating a homomorphic encryption.

Meanwhile, for linear transformation after an approximate modulus operation, an inverse matrix of a matrix described above may be used, and an inverse matrix may also be decomposed into block diagonal matrices as below, and an operation may be performed with a plurality of decomposed block diagonal matrices.

$$iDFT_n^{RN} := (DFT_r^{NR})^{-1} = \left(D_n^{(n)} \cdot D_{n/2}^{(n)} \cdot \ldots \cdot D_2^{(n)}\right)^{-1}$$ [Formula 19]

$$= (D_2^{(n)})^{-1} \cdot (D_d^{(n)})^{-1} \cdot \ldots \cdot (D_n^{(n)})^{-1}$$

Formula 19 may be decomposed into matrices in specific forms having useful attributes as in formula 20 below.

$$\begin{bmatrix} I_{n/k} & I_{n/k} \\ W_{n/k} & -W_{n/k} \end{bmatrix}^{-1} = \frac{1}{2} \begin{bmatrix} I_{n/k} & \overline{W_{n/k}} \\ I_{n/k} & -\overline{W_{n/k}} \end{bmatrix}$$ [Formula 20]

To express in a different way, $2^i$ which is a divisor of n may be expressed as a formula as below.

$$\left(D_{2^i}^{(n)}\right)^{-1} = \frac{1}{2} \overline{D_{2^i}^{(n)}}^T$$ [Formula 21]

That is, an iDFT$_n^{RN}$ matrix may also be decomposed into sparse diagonal matrices as DFT$_n^{NR}$, and it enables a fast operation.

Figure 7:
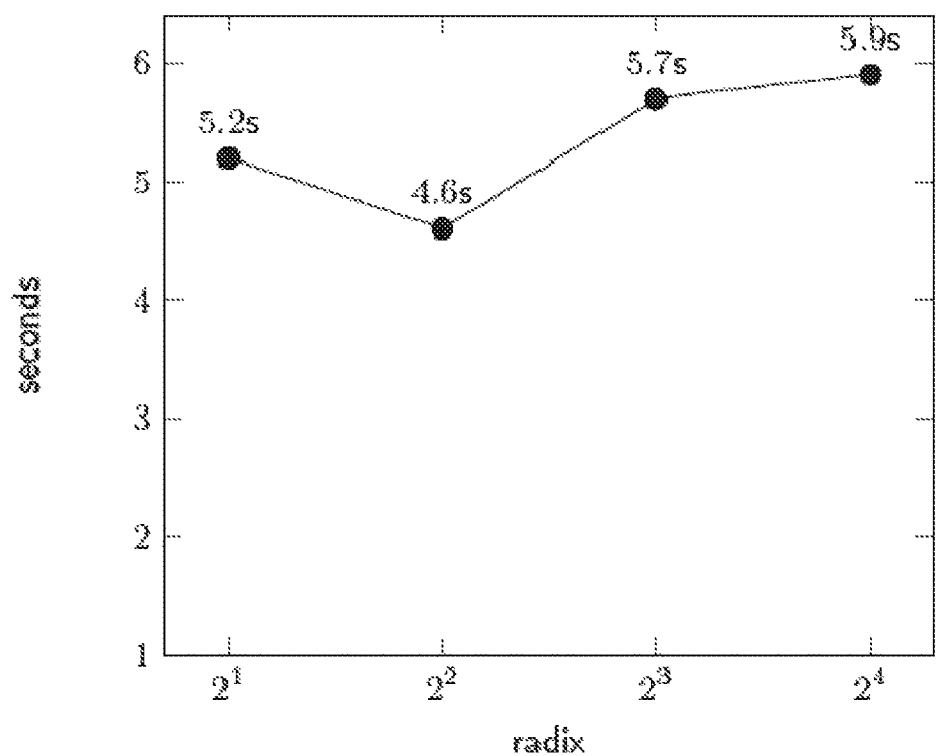
FIG. 7 is a diagram for illustrating an effect of a linear calculating operation according to the disclosure.
Figure 8:
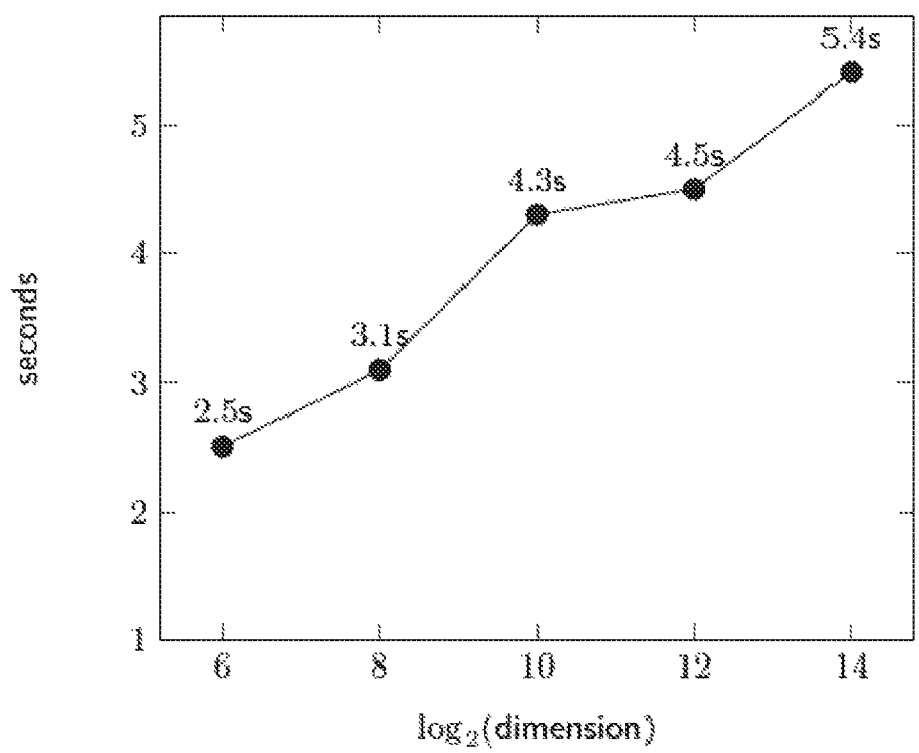
FIG. 8 is a diagram for illustrating an effect of a linear calculating operation according to the disclosure.

FIGS. 7 and 8 are diagrams for illustrating an effect of a linear calculating operation according to the disclosure. Specifically, FIG. 7 is a diagram illustrating a timing result of setting of various radixes for an n=$2^{12}$ dimension, and FIG. 8 is a diagram illustrating a timing result of various degrees having a radix 4.

Referring to FIG. 7, it can be seen that even if a radix increases, timing does not increase greatly.

Also, referring to FIG. 8, it can be seen that timing increases in a log way of a dimension n. That is, it can be seen that a calculation is performed with a depth which is fairly fast and similar.

A result of an experiment in case linear transformation as described above is applied to each step of a homomorphic encryption operation is as shown in table 1 below.

TABLE 1

|  | Key Gen | Linear Trans | Eval sin | Total | Amortized Time |
|---|---|---|---|---|---|
| Previous | 25 hours | 26 hours | 30 sec | 26 hours | 5.71 sec |
| Ours | 44 sec | 97 sec | 30 sec | 127 sec | 3.8 ms |

Referring to table 1, it can be seen that a linear transformation process is faster by 700 times compared to a conventional method, and a dramatic saving of time occurs not only in linear transformation but also in a key generating process.

Hereinafter, the aforementioned approximate modulus operating operation will be explained in detail.

If a target to be calculated is determined in advance, there may be a little need for a rebooting method, but in a machine learning process which is becoming an issue recently, there are many situations wherein it cannot be figured out when processes of learning will end. Accordingly, in the case of performing machine learning for encrypted data, the performance of a rebooting method is very important.

For a rebooting method, a decryption function should be calculated in an encrypted state. A decryption function is expressed as the aforementioned formula 7. Here, the main point is calculating mod q which is a modulus operation in an encrypted state.

In formula 7, each coefficient has a property that it is very small compared to a modulus value of an encryption which is q. Thus, when this property is used, a modulus operation is approximated as a sine function. Such a sine function can be expressed as formula 22 as follows.

$$\frac{q}{2\pi} \sin\left(\frac{2\pi x}{q}\right) \sim [x]_q$$ [Formula 22]

For an approximate modulus operation, in order to operate a sine function in a homomorphically encrypted state, it is important to express the function as an addition and a multiplication in a given range [−K, K]. That is, as operations for a homomorphic encryption, only additions, subtractions, and multiplications are possible, and thus there is a need to replace a sine operation with an addition, a subtraction, and a multiplication for which a homomorphic encryption is possible. Here, a given range may be [−12, 12], but in case the environment changes, a different range may be used.

In the past, an approximate polynomial for a sine function was calculated by using a taylor method, a chebyshev method, etc., and the polynomial was used, but these methods could not use the characteristic that an input value of a sine function is very close to an integer point, and accordingly, there was a problem that the accuracy of a calculation is low or the depth of an operation is high.

Accordingly, in the disclosure, an approximate modulus operation method in consideration of the aforementioned characteristic is used.

If f refers to a function in $C^{n+1}[a, b]$, and $p_n(x)$ refers to a polynomial satisfying degree≤n interpolating sin(2πx) (or cos(2πx)) in distinguished points in an n+1 number ($x_0$, $x_1$, ..., $x_n \in [a, b]$), an error value can be calculated as formula 24 as follows. Meanwhile, formula 22 is expressed as a sine function, but a sine function and a cosine function can be converted only with a x←x−1/4 shifting operation. Also, hereinafter, calculation of an approximate polynomial for a cosine function as in formula 23 as follows by using a double angle formula will be described.

$$p_n(x_{i,j}) = \cos(2\pi x_{i,j}) \text{ for } 1 \leq i \leq m, 1 \leq j \leq d_i \qquad [\text{Formula 23}]$$

$$f(x) - p_n(x) = \frac{f^{(n+1)}(\psi_x)}{(n+1)!} \cdot \prod_{i=1}^{m}(x - x_i)^{d_i} \qquad [\text{Formula 24}]$$

In formula 24, it is difficult to exactly presume the $$\frac{f^{(n+1)}(\psi_x)}{(n+1)!}$$

term, but in case the function f is sin(2πx) (or cos(2πx)), it is limited by a constant. Accordingly, an error boundary of a polynomial is dependent on a different term, i.e., formula 25 as follows.

$$w(x) = \prod_{i=1}^{m}(x - x_i)^{d_i} \qquad [\text{Formula 25}]$$

Here, $x_0, x_1, \ldots, x_n \in [a, b]$ are determined in advance, and are referred to as nodes. Accordingly, there is a need to select $\{x_i\}_{1 \leq i \leq n}$ such that the maximum value of w(x) in a specific domain for x is minimized.

In the disclosure, a node is selected at each interval $$I_i = \left[i - \frac{1}{4} - \epsilon, \ i - \frac{1}{4} + \epsilon\right]$$

within a −K<i<K range of all input values i. To be more exact, a node $d_i$ satisfying $$x_{i,j} = i - \frac{1}{4} + \epsilon \cdot \cos\left(\frac{2j-1}{2d_i}\pi\right)$$

in a $1 \leq j \leq d_i$ range in an interval $I_i$ is selected.

If a polynomial $p_n$ of an n-th degree wherein $n=\Sigma d_i - 1$, and which approximates a cos(2πx) function at n+1 points is assumed, $p_n$ satisfies the following.

$$p_n(x_{i,j}) = \cos(2\pi x_{i,j}) \text{ for } 1 \leq i \leq m, 1 \leq j \leq d_i \qquad [\text{Formula 26}]$$

If formula 26 as described above is reflected to the following formula 27, the upper boundary ∥w(x)∥ is as formula 28.

$$\|f(x) - p_n(x)\| \leq \frac{|f^{(n+1)}(\psi_x)|}{(n+1)!} \cdot \frac{1}{2^n} \cdot \left(\frac{b-a}{2}\right)^{n+1} \qquad [\text{Formula 27}]$$

Here, f(x) is a specific function (i.e., a sine function or a cosine function), and Pn(x) is an approximate polynomial.

$$\|w(x)\| \leq \frac{1}{2^{d_i-1}} \cdot \epsilon^{d_i} \cdot \prod_{j=1}^{K-1-i}(j+\epsilon)^{d_{i+i}} \cdot \prod_{j=1}^{K-1+i}(j+\epsilon)^{d_{i-j}} \qquad [\text{Formula 28}]$$

Here, formula 27 has a condition of $$x \in I_i = \left[i - \frac{1}{4} - \epsilon, \ i - \frac{1}{4} + \epsilon\right].$$

Referring to formula 28, it can be seen that the error boundary is reduced as a $2^{d_i-1}$ factor, and if $M_i = \text{Max}_{x \in I_i} \|w(x)\|$ is indicated, formula 29 as follows can be achieved.

$$\|\cos(2\pi x) - p_n(x)\| \leq \qquad [\text{Formula 29}]$$

$$\frac{(2\pi)^{n+1}}{(n+1)!} \cdot \text{Max}\{M_{-K+1}, M_{-K+2}, \ldots, M_{K-1}\} \text{ for } x \in$$

$$\bigcup_{i=-K+1}^{K-1} I_i \text{ with } I_i = \left[i - \frac{1}{4} - \epsilon, \ i - \frac{1}{4} + \epsilon\right]$$

Meanwhile, for each integer i, it is necessary to determine each coefficient $d_i$. A method of determining a coefficient of a designed approximate polynomial will be explained below with reference to FIG. 9.

FIG. 9 is a diagram for illustrating a method for calculating a coefficient of an approximate polynomial according to the disclosure.

Referring to FIG. 9, in the initial stage, all Is are initialized as $d_i=1$.

Then, each $M_i$ is found, and an index having the maximum $M_i$ is found. Afterwards, if $i_0 = \text{argmax} M_i$, $d_{i_0}$ is increased by 1, and this operation is repeated until the total level $((=\Sigma d_i - 1))$ becomes the target level.

If a coefficient of an approximate polynomial is calculated by a method as above, an approximate modulus operation for a homomorphic encryption that was linearly transformed previously may be performed by using an approximate polynomial to which the calculated coefficient is reflected.

Meanwhile, the number of the aforementioned coefficient of an approximate polynomial, i.e., the degree of an approximate polynomial may be varied according to a user's selection, and it is preferable that one degree among 7th to 80th degrees is used. Such a degree may be determined by a result of various simulations, and in addition to the aforementioned degree, a range may be used.

Also, as an approximate polynomial calculated by the aforementioned process was calculated by applying a double angle operation, an approximate modulus operation may be performed through an operating operation of repeating a homomorphic encryption for the calculated approximate polynomial as many as the double angle number of times. Here, a double angle operation uses the property that sin(2x)=2 sin(x)cos(x).

For example, in case the q value of formula 22 is 32(2^5), and if it is assumed that y=x/32, and an operation using an approximate polynomial calculated in the previous process for Cos(2πy) is repeated five times, the value of cos(2πx/32) can be achieved, and through a rotation operation of this, the value of sin(2πx/32) can be calculated.

Hereinafter, the effect of an approximate modulus operation method using the aforementioned approximate polynomial will be explained.

Figure 10:
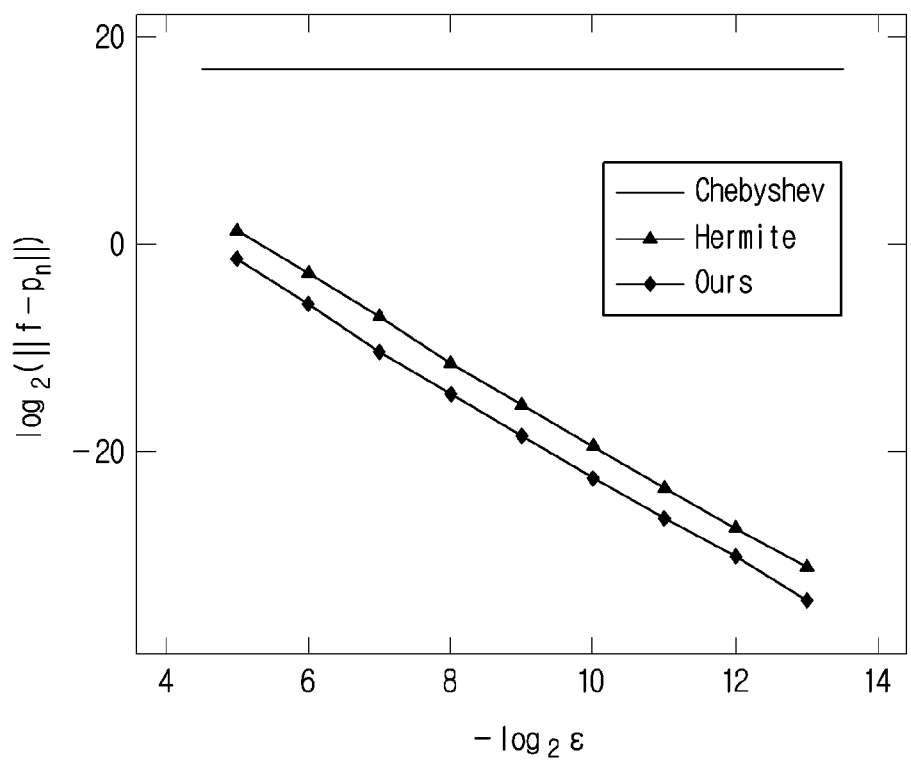
FIG. 10 is a diagram for illustrating an effect of an approximate modulus operation according to the disclosure.
Figure 11:
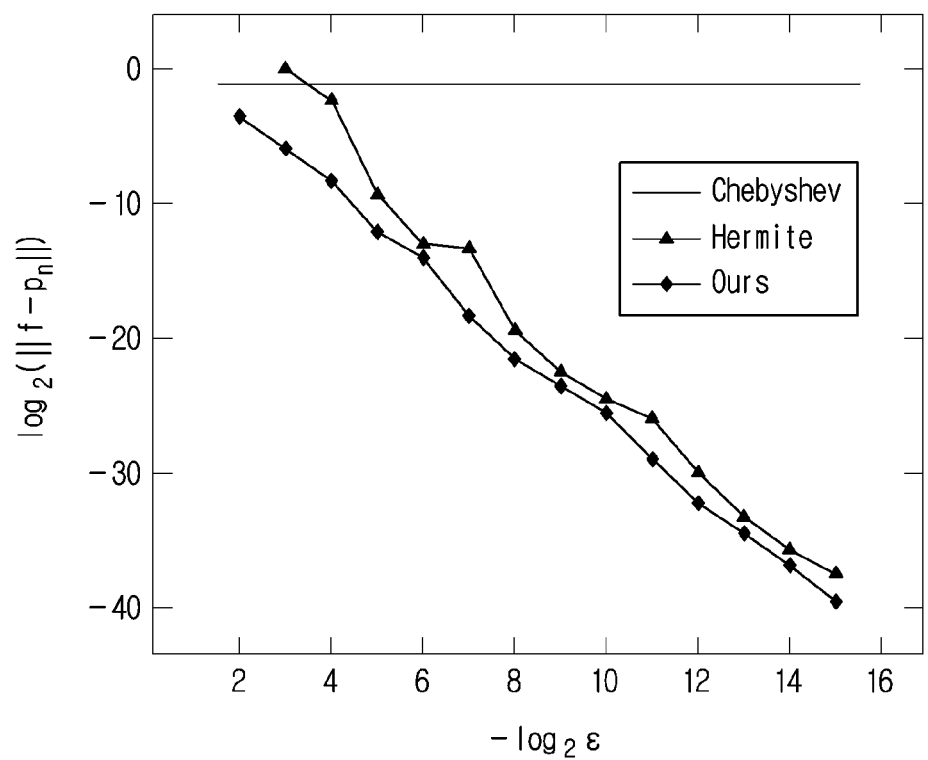
FIG. 11 is a diagram for illustrating an effect of an approximate modulus operation according to the disclosure.

FIGS. 10 and 11 are diagrams for illustrating an effect of an approximate modulus operation according to the disclosure. Specifically, FIGS. 10 and 11 are graphs indicating logical errors for a cosine function with respect to each of the disclosure and a conventional method, and FIG. 10 illustrates a result of an experiment in case n=86 is fixed, and $\epsilon$ is changed, and FIG. 11 illustrates a result of an experiment in case $\log_2 \epsilon = -10$ is fixed, and n is changed.

Referring to FIGS. 10 and 11, it can be seen that the value in a method according to the disclosure is much smaller than the value in the conventional Chebyshev method. Also, it can be seen that the value in a method according to the disclosure is also smaller than the value in the conventional Hermite method having superior performance.

Meanwhile, the method for processing an encryption according to the aforementioned various embodiments may be implemented in the form of a program code for performing each step, and stored in a recording medium and distributed. In this case, an apparatus on which the recording medium is mounted may perform operations such as the aforementioned encryption and encryption processing, etc.

Such a recording medium may be various types of computer readable media such as a ROM, a RAM, a memory chip, a memory card, an external hard, a hard, a CD, a DVD, a magnetic disk or a magnetic tape, etc.

So far, the disclosure has been described with reference to the accompanying drawings, but the scope of the disclosure is intended to be determined by the appended claims, and is not intended to be interpreted as being limited to the aforementioned embodiments and/or drawings. Also, it should be clearly understood that alterations, modifications, and amendments of the disclosure described in the claims that are obvious to a person skilled in the art are also included in the scope of the disclosure.

What is claimed is:

1. A method for processing a homomorphic encryption comprising:
    linearly transforming a homomorphic encryption for an approximate message including an error;
    performing an approximate modulus operation for the linearly transformed homomorphic encryption by using a multi-degree polynomial set such that input values within a predetermined range are approximate to an integer point; and
    linearly transforming the homomorphic encryption which was approximately modulus operated; and
    encrypting the linearly transformed homomorphic encryption which was approximately modulus operated into a form of encryption,
    wherein the multi-degree polynomial is an interpolation polynomial for a sine function or a cosine function that approximates the integer point from multiple input values within the predetermined range.

2. The method for processing a homomorphic encryption of claim 1,
    wherein the multi-degree polynomial is a polynomial having a degree among any one of a 7th degree to an 80th degree, and the predetermined range is from −12 to 12.

3. The method for processing a homomorphic encryption of claim 1,
    wherein the performing an approximate modulus operation comprises:
    setting a double-angle number of times and a multi-degree polynomial corresponding to the double-angle number of times, and performing an approximate modulus operation by operating the linearly transformed homomorphic encryption as many times as the set double-angle number of times by using the set multi-degree polynomial.

4. The method for processing a homomorphic encryption of claim 1,
    wherein the linearly transforming a homomorphic encryption comprises:
    converting the homomorphic encryption into a form of polynomial; and
    applying the converted homomorphic encryption to a predefined matrix.

5. The method for processing a homomorphic encryption of claim 4,
    wherein the applying comprises:
    decomposing the predefined matrix into a plurality of block diagonal matrices wherein there is a value in a diagonal component and the other values are 0, and applying the homomorphic encryption sequentially to the plurality of block diagonal matrices.

6. The method for processing a homomorphic encryption of claim 5,
    wherein the applying comprises:
    applying the homomorphic encryption to the plurality of block diagonal matrices in units of two continuous matrices.

7. An operation apparatus comprising:
    a memory storing a homomorphic encryption for an approximate message including an error; and
    a processor performing an operation for the homomorphic encryption, wherein the processor is configured to:
        linearly transform the homomorphic encryption for an approximate message including an error,
        perform an approximate modulus operation for the linearly transformed homomorphic encryption by using a multi-degree polynomial set such that input values within a predetermined range are approximate to an integer point,
        linearly transform the homomorphic encryption which was approximately modulus operated, and
        encrypt the linearly transformed homomorphic encryption which was approximately modulus operated into a form of encryption, and
    wherein the multi-degree polynomial is an interpolation polynomial for a sine function or a cosine function that approximates the integer point from multiple input values within the predetermined range.

8. The operation apparatus of claim 7,
    wherein the multi-degree polynomial is a polynomial having a degree among any one of a 7th degree to an 80th degree, and the predetermined range is from −12 to 12.

9. The operation apparatus of claim 7,
    wherein the processor is configured to:
    set a double-angle number of times and a multi-degree polynomial corresponding to the double-angle number of times, and perform an approximate modulus operation by operating the linearly transformed homomorphic encryption as many times as the set double-angle number of times by using the set multi-degree polynomial.

10. The operation apparatus of claim 7,
wherein the processor is configured to:
convert the homomorphic encryption into a form of polynomial, and linearly transform the homomorphic encryption by applying the converted homomorphic encryption to a predefined matrix.

11. The operation apparatus of claim 10,
wherein the processor is configured to:
decompose the predefined matrix into a plurality of block diagonal matrices wherein there is a value in a diagonal component and the other values are 0, and linearly transform the homomorphic encryption by applying the homomorphic encryption sequentially to the plurality of block diagonal matrices.

12. The operation apparatus of claim 11:
wherein the processor is configured to:
linearly transform the homomorphic encryption by applying the homomorphic encryption to the plurality of block diagonal matrices in units of two continuous matrices.

* * * * *